United States Patent
Fang et al.

(10) Patent No.: US 10,840,965 B2
(45) Date of Patent: Nov. 17, 2020

(54) TEST SYSTEM

(71) Applicant: Siliconware Precision Industries Co., Ltd., Taichung (TW)

(72) Inventors: Bo-Siang Fang, Taichung (TW); Kuan-Ta Chen, Taichung (TW); Ying-Wei Lu, Taichung (TW); Chia-Chu Lai, Taichung (TW); Cheng-Tsai Hsieh, Taichung (TW)

(73) Assignee: Siliconware Precision Industries Co., Ltd., Taichung (TW)

( * ) Notice: Subject to any disclaimer, the term of this patent is extended or adjusted under 35 U.S.C. 154(b) by 0 days.

(21) Appl. No.: 16/843,386

(22) Filed: Apr. 8, 2020

(65) Prior Publication Data
US 2020/0304165 A1    Sep. 24, 2020

Related U.S. Application Data

(62) Division of application No. 16/534,634, filed on Aug. 7, 2019, now Pat. No. 10,659,097.

(30) Foreign Application Priority Data

Mar. 20, 2019   (TW) .............................. 108109573 A

(51) Int. Cl.
| | | |
|---|---|---|
| *H04B 17/00* | (2015.01) | |
| *H04B 1/48* | (2006.01) | |
| *H04B 1/7085* | (2011.01) | |
| *H04B 1/04* | (2006.01) | |

(Continued)

(52) U.S. Cl.
CPC .............. *H04B 1/48* (2013.01); *G01S 13/325* (2013.01); *G01S 13/40* (2013.01); *H04B 1/0458* (2013.01); *H04B 1/7085* (2013.01); *H04B 2001/0491* (2013.01)

(58) Field of Classification Search
CPC ...... H04B 1/48; H04B 1/0458; H04B 1/7085; H04B 17/00; G01S 13/325
See application file for complete search history.

(56) References Cited

U.S. PATENT DOCUMENTS

2017/0353338 A1\* 12/2017 Amadjikpe ............. H01Q 1/243
2018/0294896 A1\* 10/2018 Foegelle ............. H04B 17/0087
2019/0302184 A1\* 10/2019 Rowell ................ H04B 17/101

\* cited by examiner

*Primary Examiner* — Tuan Pham
(74) *Attorney, Agent, or Firm* — Mintz Levin Cohn Ferris Glovsky and Popeo, P.C.; Peter F. Corless; Steven M. Jensen

(57) ABSTRACT

A testing system includes: a bilinear polarized antenna for receiving and dividing a circularly polarized radio wave associating with a horizontal and a vertical polarization path of an object-to-be-tested into a first and a second high frequency signal; a phase retarder for delaying a phase of the first high frequency signal by 90 degrees to form a first high frequency signal with a phase delay of 90 degrees; a power splitter for receiving or synthesizing the first high frequency signal with the phase delay of 90 degrees and the second high frequency signal; and a high frequency signal transceiver for measuring power of the first high frequency signal with the phase delay of 90 degrees and the second high frequency signal and determining states of the horizontal and vertical polarization paths of the object-to-be-tested based on the power. Therefore, the testing system can speed up testing of the object-to-be-tested.

7 Claims, 6 Drawing Sheets

(51) Int. Cl.
*G01S 13/32* (2006.01)
*G01S 13/40* (2006.01)

TEST SYSTEM

CROSS-REFERENCE TO RELATED APPLICATION(S)

This application is a divisional of copending application U.S. Ser. No. 16/534,634, filed on Aug. 7, 2019, which claims under 35 U.S.C. § 119(a) the benefit of Taiwanese Application No. 108109573, filed on Mar. 20, 2019, the entire contents of which are incorporated herein by reference.

BACKGROUND

1. Technical Field

The present disclosure relates to testing systems, and, more particularly, to a testing system for testing a horizontal polarization path and a vertical polarization path of an object-to-be-tested.

2. Description of the Prior Art

In the prior art, an antenna on an object-to-be-tested, such as an mm wave antenna in package (AiP), has feeding points for two signals, i.e., a horizontal polarization signal and a vertical polarization signal, which will pass through a horizontal polarization path and a vertical polarization path, respectively, via different circuits and solder bumps.

In a final test (FT) testing station for an object-to-be-tested, since the radio waves of the horizontal polarization signal and the vertical polarization signal are orthogonal, two measuring ports of a bilinear polarized antenna on a measuring probe of a testing system have to be switched, in order to measure states of the horizontal polarization path and the vertical polarization path of the object-to-be-tested. Such a switching scenario greatly reduces the measurement speed of the object-to-be-tested.

In general, current circularly polarized radio waves are applied to satellite applications, such as the global positioning system (GPS), but are rarely applied to 5G mobile communication transmission since in a normal environment the mobile communication transmission heavily relies on multi-path reflection to transmit signals to mobile communication devices (e.g., a mobile phone) indoors, which is thus rarely seen in the over the air (OTA) test for an object-to-be-tested, such as an mm wave AiP.

Therefore, how to provide a novel or inventive testing system is becoming an urgent issue in the art.

SUMMARY

The present disclosure provides a testing system that can test a horizontal polarization path and a vertical polarization path of an object-to-be-tested at the same time, to speed up the measurement of the object-to-be-tested.

The present disclosure provides a testing system, comprising: a bilinear polarized antenna configured for receiving and dividing a circularly polarized radio wave associating with a horizontal polarization path and a vertical polarization path of an object-to-be-tested into a first high frequency signal and a second high frequency signal; a phase retarder electrically connected to the bilinear polarized antenna and configured for delaying a phase of the first high frequency signal from the bilinear polarized antenna by 90 degrees to form a first high frequency signal with a phase delay of 90 degrees; a power splitter electrically connected to the phase retarder and the bilinear polarized antenna and configured for receiving or synthesizing the first high frequency signal with the phase delay of 90 degrees from the phase retarder and the second high frequency signal from the bilinear polarized antenna; and a high frequency signal transceiver electrically connected to the power splitter and configured for measuring power of the first high frequency signal with the phase delay of 90 degrees and the second high frequency signal received or synthesized by the power splitter and determining states of the horizontal polarization path and the vertical polarization path of the object-to-be-tested based on the power.

The present disclosure further provides a testing system, comprising: a bilinear polarized antenna configured for receiving and dividing a circularly polarized radio wave associating with a horizontal polarization path and a vertical polarization path of an object-to-be-tested into a first high frequency signal and a second high frequency signal; a first power splitter and a second power splitter electrically connected to the bilinear polarized antenna and configured for receiving from the bilinear polarized antenna the first high frequency signal and the second high frequency signal, respectively; a first phase retarder electrically connected to the first power splitter and configured for delaying a phase of the first high frequency signal from the first power splitter by 90 degrees to form a first high frequency signal with a phase delay of 90 degrees; a third power splitter electrically connected to the first phase retarder and the second power splitter and configured for receiving or synthesizing the first high frequency signal with the phase delay of 90 degrees from the first phase retarder and the second high frequency signal from the second power splitter; and a first power meter electrically connected to the third power splitter and configured for measuring power of the first high frequency signal with the phase delay of 90 degrees and the second high frequency signal received or synthesized by the third power splitter and determining states of the horizontal polarization path and the vertical polarization path of the object-to-be-tested based on the power.

It will be readily understood that the features and advantages of the present disclosure will be more apparent in the following detailed description and embodiments of the devices and methods, as represented in the drawings. The following description will partially describe the additional features and advantages of the present disclosure, and may be obtained from the description of this disclosure or embodiments of the present disclosure. The features and advantages of the present disclosure may also be obtained from the components specified in the claims and the combination thereof. It should be further understood that the above general description and the following detailed description are intended only by way of example, and simply illustrates certain concepts of the devices and methods, as disclosed and claimed herein.

BRIEF DESCRIPTION OF THE DRAWINGS

The disclosure can be more fully understood by reading the following detailed description of the embodiments, with reference made to the accompanying drawings, wherein.

DETAILED DESCRIPTION

Figure 1A:
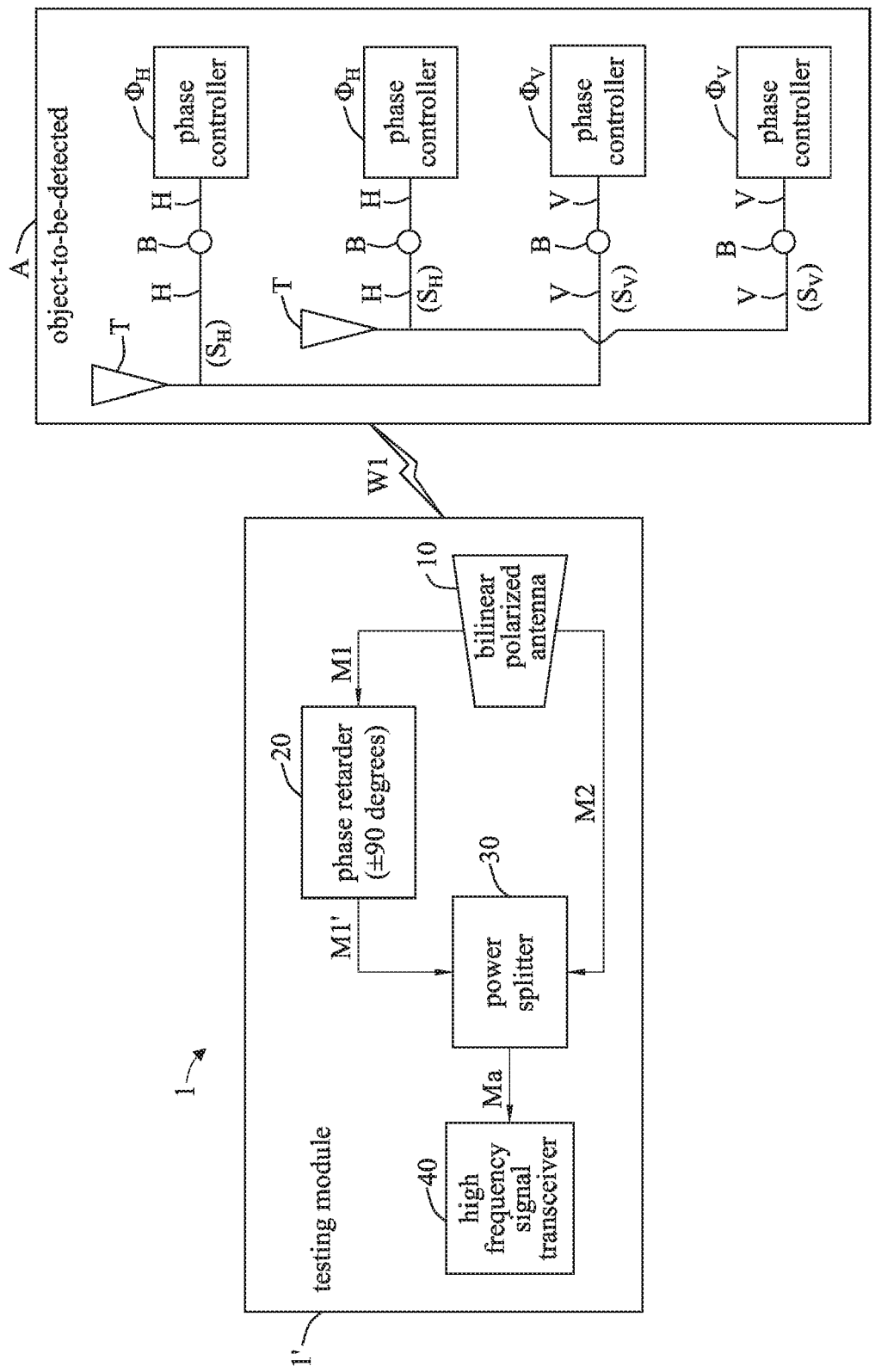
FIG. 1A is a block diagram of a testing system in a receiving mode according to the present disclosure.

The following illustrative embodiments are provided to illustrate the disclosure of the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

The physical meaning of the orthogonality of horizontal and vertical polarization lies in: when an emitting antenna and a receiving antenna are both horizontal polarization of vertical polarization, energy will be fully transmitted (100%) from the emitting antenna to the receiving antenna; and when the emitting antenna is horizontal polarization and the receiving antenna is vertical polarization, no energy will be transmitted (0%) from the emitting antenna to the receiving antenna. Therefore, if a horizontal polarization signal and a vertical polarization signal are input to a horizontal polarization path and a vertical polarization path of an object-to-be-tested respectively at the same time, and the phase of the horizontal polarization signal differs from the phase of the vertical polarization signal by 90 degrees (i.e., a time difference being ¼ wavelength), a circularly polarized radio wave will be formed. According to the arrangement of the horizontal polarization signal or the vertical polarization signal being +90 degrees or −90 degrees, a left-hand circularly polarized radio wave or a right-hand circularly polarized radio wave can be formed, and the left-hand circularly polarized radio wave and the right-hand circularly polarized radio wave are also orthogonal to each other.

A radio wave, when incident to a surface of a conductive element (e.g., metal) of an object-to-be-tested, will be reflected. Based on the polarities of the incident radio wave, characteristics of the reflected radio wave can be obtained. For instance, (1) if the incident radio wave is vertically linear polarization, the reflected radio wave is also vertically linear polarization; (2) if the incident radio wave is horizontally linear polarization, the reflected radio wave is also horizontally linear polarization; (3) if the incident radio wave is right-hand circularly polarization, the reflected radio wave is left-hand circularly polarization; and (4) if the incident radio wave is left-hand circularly polarization, the reflected radio wave is right-hand circularly polarization. In cooperation with the orthogonality characteristics, the circularly polarized radio wave can resist odd-numbered reflection, such as the first reflection, the third reflection etc.

Since the reflected radio wave will have physic characteristics of polarized orthogonality after the circularly polarized radio wave bumps into the conductive element (e.g., metal) of the object-to-be-tested, in the over-the-air (OTA) test of the object-to-be-tested, the antenna (the receiving antenna) is not likely to be interfered, because the first reflection (with the greatest reflection energy) occurred by the wall of an isolation box (a metal isolation room) will not be received by the antenna (the receiving antenna).

Based on the above characteristics, the present disclosure provides two testing systems, which can be applied to equipment of final-test (FT) testing stations for an object-to-be-tested, and can be selected based on the measurement demand of the object-to-be-tested. The testing circuit of the testing system according to the present disclosure can test a horizontal polarization path and a vertical polarization path of the object-to-be-tested at the same time, to save the time for switching the horizontal polarization path or the vertical polarization path, speed up (two times the original speed) the measurement of the object-to-be-tested, and save about a half of testing time.

Figure 1B:
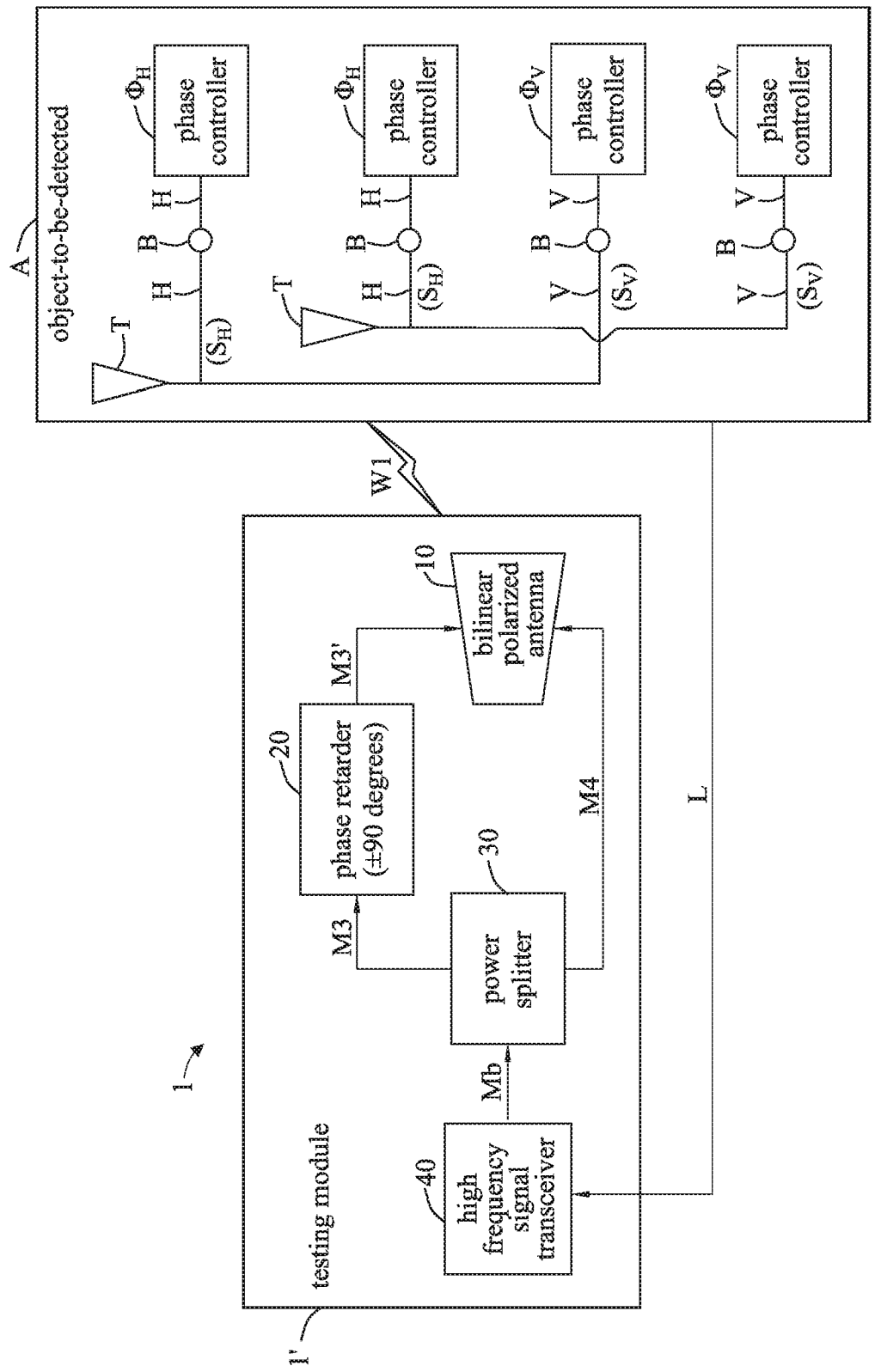
FIG. 1B is a block diagram of a testing system in a transmitting mode according to the present disclosure.

FIG. 1A is a block diagram of a testing system 1 in a receiving mode according to the present disclosure. FIG. 1B is a block diagram of the testing system 1 in a transmitting mode according to the present disclosure. The testing system 1 comprises a bilinear polarized antenna 10, a phase retarder 20, a power splitter 30 and a high frequency signal transceiver 40 that can be disposed in the same testing module 1'. The phase retarder 20 is electrically connected to bilinear polarized antenna 10. The power splitter 30 is electrically connected to phase retarder 20 and the bilinear polarized antenna 10. The high frequency signal transceiver 40 is electrically connected to power splitter 30.

As shown in FIG. 1A, when the testing system 1 is in the receiving mode, the bilinear polarized antenna 10 may receive and divide a circularly polarized radio wave W1 associating with a horizontal polarization path H and a vertical polarization path V of an object-to-be-tested A into a first high frequency signal M1 and a second high frequency signal M2. The phase retarder 20 delays a phase of the first high frequency signal M1 by 90 degrees (i.e., ±90 degrees or time difference being ¼ wavelength) to form a first high frequency signal M1' with a phase delay of 90 degrees. The power splitter 30 may receive or synthesize the first high frequency signal M1' with the phase delay of 90 degrees from the phase retarder 20 and the second high frequency signal M2 from the bilinear polarized antenna 10 into a high frequency signal Ma, for example. The high frequency signal transceiver 40 may measure power of the first high frequency signal M1' with the phase delay of 90 degrees and the second high frequency signal M2 received or synthesized by the power splitter 30, and determine states of the horizontal polarization path H and the vertical polarization path V of the object-to-be-tested A or quality of a conductive element B thereon based on the power. When the power is greater than a threshold, the horizontal polarization path H and the vertical polarization path V are good or normal, or the conductive element B is not defective and has good bonding quality. When the power is less than the threshold, at least one of the horizontal polarization path H and the vertical polarization path V is not good and abnormal, or the conductive element B is defective and has poor bonding quality.

The object-to-be-tested A may be a semiconductor device, an antenna device or a mobile communication device having an antenna T, the horizontal polarization path H, the vertical polarization path V, the conductive element B, a phase controller $\Phi_H$ and a phase controller $\Phi_V$. The antenna T may form the circularly polarized radio wave W1 based on the horizontal polarization signal $S_H$ from the horizontal polarization path H and the vertical polarization signal $S_V$ from the vertical polarization path V, and transmit the circularly polarized radio wave W1 to the bilinear polarized antenna

10. The phase controller $\Phi_H$ may control or adjust a phase of the horizontal polarization signal $S_H$. The phase controller $\Phi_V$ may control or adjust a phase of the vertical polarization signal $S_V$.

The circularly polarized radio wave W1 may be a left-hand circularly polarized radio wave or a right-hand circularly polarized radio wave. The antenna T may be a patch antenna. The conductive element B may be a conductive bump, a solder ball or a tin ball. The semiconductor device may be a semiconductor package, a semiconductor structure or a chip package. The antenna device may be an AiP, such as an mm wave AiP. The mobile communication device may be a 5G mobile communication device. However, the present disclosure is not limited to the above-mentioned.

As shown in FIG. 1B, when the testing system 1 is in the transmitting mode, the high frequency signal transceiver 40 may transmit a high frequency signal Mb, the power splitter 30 divides the high frequency signal Mb from the high frequency signal transceiver 40 into a third high frequency signal M3 and a fourth high frequency signal M4, and the phase retarder 20 delays a phase of the third high frequency signal M3 from the power splitter 30 by 90 degrees (i.e., ±90 degrees or a time difference being ¼ wavelength) to form a third high frequency signal M3' with a phase delay of 90 degrees. The bilinear polarized antenna 10 may form another circularly polarized radio wave W1 based on the third high frequency signal M3' with the phase delay of 90 degrees from the phase retarder 20 and the fourth high frequency signal M4 from the power splitter 30, and transmit the another circularly polarized radio wave W1 to the antenna T of the object-to-be-tested A. The antenna T divides the another circularly polarized radio wave W1 into a horizontal polarization signal $S_H$ and a vertical polarization signal $S_V$, which pass through the horizontal polarization path H and the vertical polarization path V respectively. The high frequency signal transceiver 40 receives via a transmission line L the horizontal polarization signal $S_H$ and the vertical polarization signal $S_V$, which pass through the horizontal polarization path H and the vertical polarization path V of the object-to-be-tested A respectively, and determines states of the horizontal polarization path H and the vertical polarization path V of the object-to-be-tested A or quality of the conductive element B thereon based on the power of the horizontal polarization signal $S_H$ and the vertical polarization signal $S_V$. When the power is greater than a threshold, the horizontal polarization path H and the vertical polarization path V are good and normal, or the conductive element B is not defective and has good bonding quality. When the power is less than the threshold, at least one of the horizontal polarization path H and the vertical polarization path V is not good and abnormal, or the conductive element B is defective and has poor bonding quality.

As shown in FIG. 1A or FIG. 1B, when a radio wave of the antenna T of the object-to-be-tested A and the circularly polarized radio wave of the bilinear polarized antenna 10 are matched, the high frequency signal transceiver 40 reads a maximum of the power, which indicates that the conductive element B of the object-to-be-tested A is not defective. When the radio wave of the antenna T of the object-to-be-tested A and the circularly polarized radio wave of the bilinear polarized antenna 10 are not matched, the high frequency signal transceiver 40 reads a value of the power that varies sensitively (changes significantly), which indicates that the conductive element B of the object-to-be-tested A is defective.

In FIGS. 1A and 1B, the testing system 1 has to cooperate with the phase control of the object-to-be-tested A. Each of the antenna T is connected to the circuits of the horizontal polarization path H and the vertical polarization path V respectively, and the phase controller $\Phi_H$ and the phase controller $\Phi_V$ are disposed on the circuits for setting phases of the horizontal polarization signal $S_H$ and the vertical polarization signal $S_V$ respectively. In an embodiment, each of the antenna T is connected to the phase controller $\Phi_H$ and the phase controller $\Phi_V$ respectively, the phase of the object-to-be-tested A is set to be an equation $\Phi_H=\Phi_V+90$ or an equation $\Phi_H=\Phi_V-90$, and this setting has to match a left-hand circularly polarized radio wave or a right-hand circularly polarized radio wave of the testing system 1.

Figure 2:
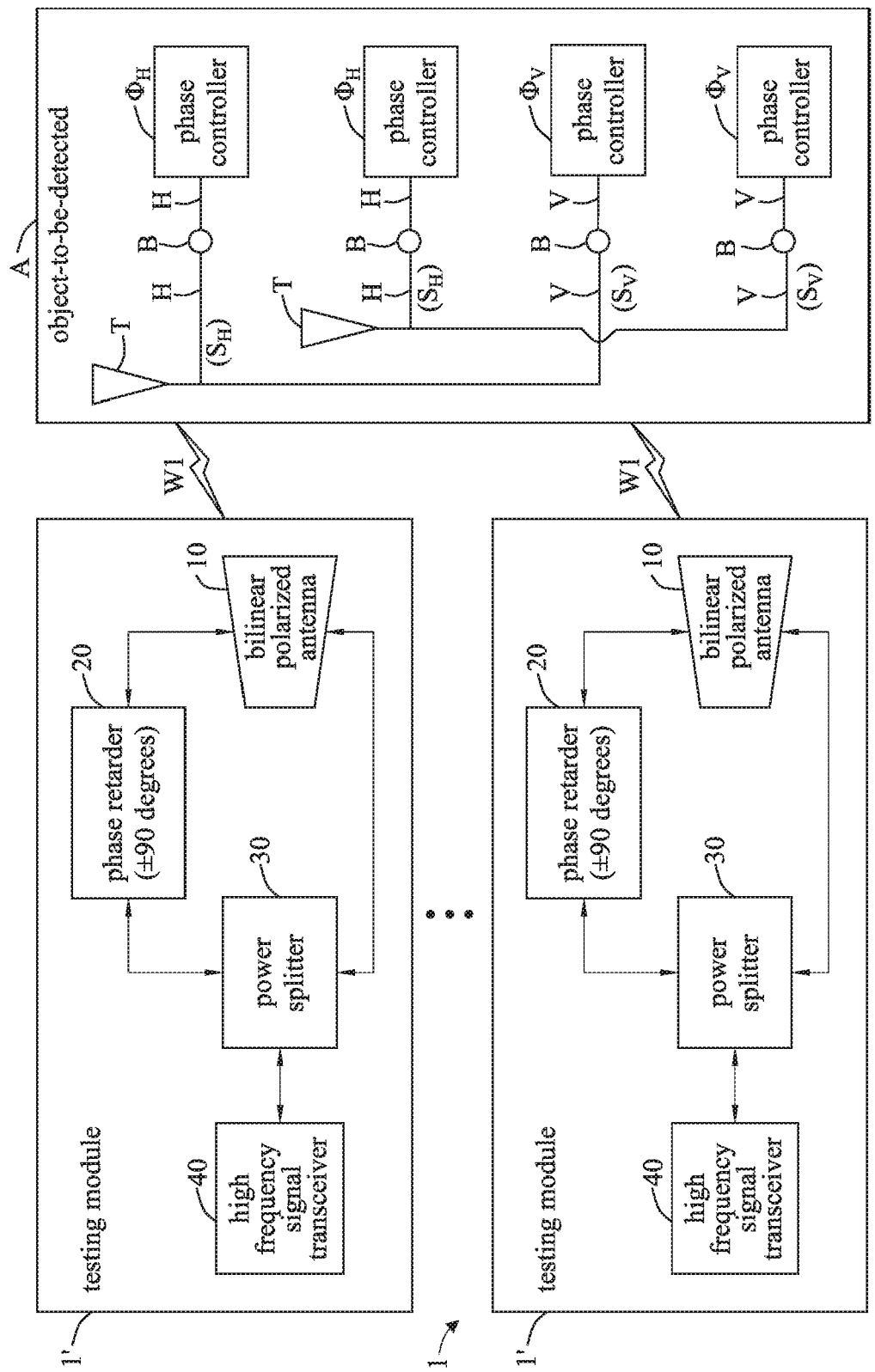
FIG. 2 is a schematic diagram of an embodiment of the testing system of FIGS. 1A and 1B according to the present disclosure.

FIG. 2 is a schematic diagram of an embodiment of the testing system 1 of FIGS. 1A and 1B according to the present disclosure. As shown in FIG. 2, the testing system 1 may comprise a plurality of the testing modules 1', each of which includes the bilinear polarized antenna 10, the phase retarder 20, the power splitter 30 and the high frequency signal transceiver 40, which are described in accordance with FIGS. 1A and 1B.

Figure 3:
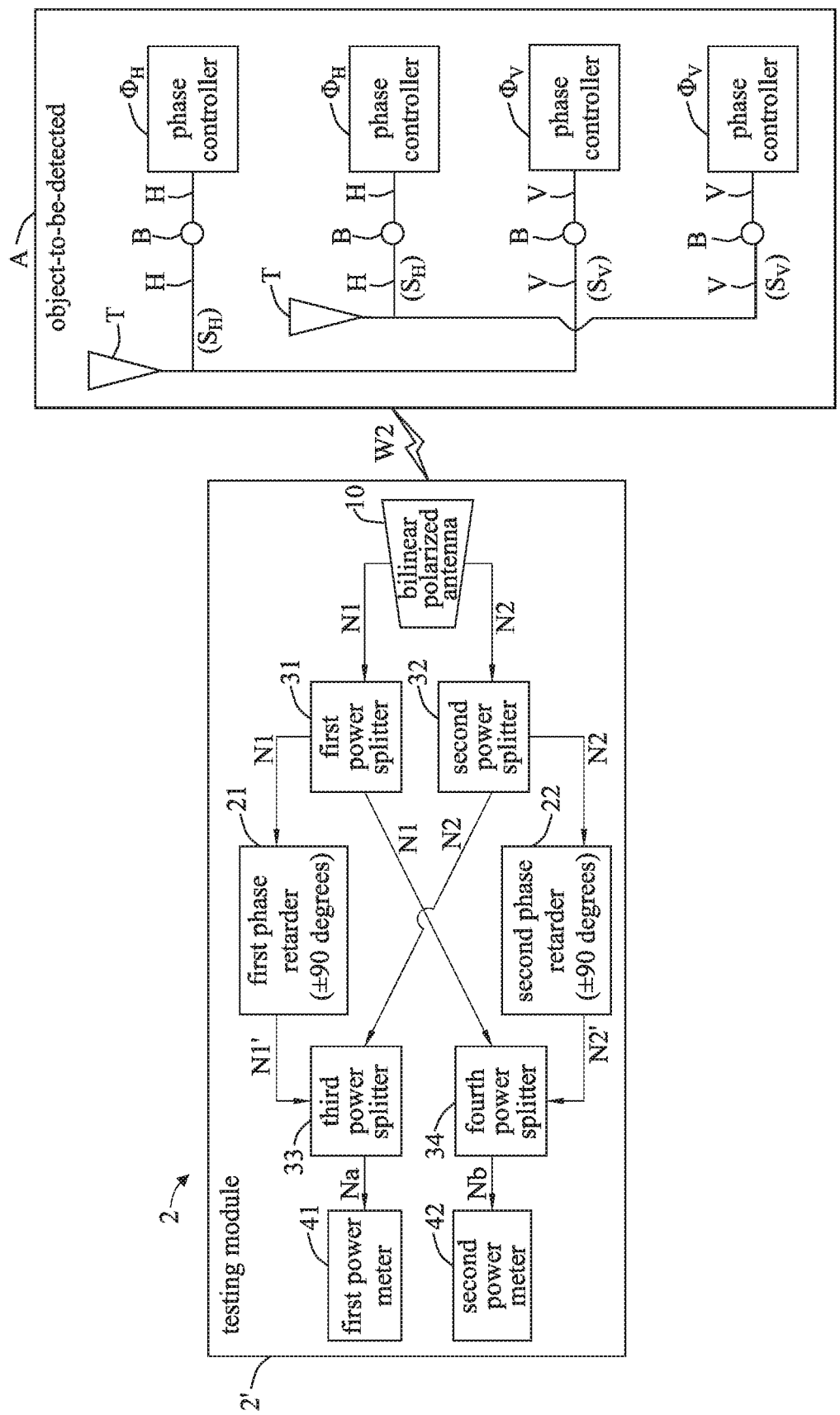
FIG. 3 is a block diagram of another testing system according to the present disclosure.

FIG. 3 is a block diagram of another testing system 2 according to the present disclosure. The testing system 2 may comprise a bilinear polarized antenna 10, a first power splitter 31, a second power splitter 32, a first phase retarder 21, a third power splitter 33 and a first power meter 41. The first power splitter 31 and the second power splitter 32 are electrically connected to the bilinear polarized antenna 10. The first phase retarder 21 is electrically connected to the first power splitter 31. The third power splitter 33 is electrically connected to the first phase retarder 21 and the second power splitter 32. The first power meter 41 is electrically connected to the third power splitter 33.

The bilinear polarized antenna 10 may receive and divide a circularly polarized radio wave W2 associating with a horizontal polarization path H and a vertical polarization path V of an object-to-be-tested A into a first high frequency signal N1 and a second high frequency signal N2. The first power splitter 31 and the second power splitter 32 may receive from the bilinear polarized antenna 10 the first high frequency signal N1 and the second high frequency signal N2 respectively. The first phase retarder 21 delays a phase of the first high frequency signal N1 from the first power splitter 31 by 90 degrees (i.e., ±90 degrees or a time difference being ¼ wavelength) to form a first high frequency signal N1' with a phase delay of 90 degrees. The third power splitter 33 may receive or synthesize the first high frequency signal N1' with the phase delay of 90 degrees from the first phase retarder 21 and the second high frequency signal N2 from the second power splitter 32 into a high frequency signal Na, for example. The first power meter 41 may measure power of the first high frequency signal N1' with the phase delay of 90 degrees and the second high frequency signal N2 received or synthesized by the third power splitter 33, and determine states of the horizontal polarization path H and the vertical polarization path V of the object-to-be-tested A or quality of a conductive element B thereon based on the power. When the power is greater than a threshold, the horizontal polarization path H and the vertical polarization path V are good and normal, or the conductive element B is not defective and has good bonding quality. When the power is less than the threshold, at least one of the horizontal polarization path H and the vertical polarization path V is not good and abnormal, or the conductive element B is defective and has poor bonding quality.

The object-to-be-tested A may be a semiconductor device, an antenna device or a mobile communication device having an antenna T, the horizontal polarization path H, the vertical polarization path V, the conductive element B, the phase controller $\Phi_H$ and the phase controller $\Phi_V$. The antenna T may form the circularly polarized radio wave W2 based on the horizontal polarization signal $S_H$ from the horizontal polarization path H and the vertical polarization signal $S_V$ from the vertical polarization path V, and transmit the circularly polarized radio wave W2 to the bilinear polarized antenna 10. The phase controller $\Phi_H$ may control or adjust the phase of the horizontal polarization signal $S_H$, and the phase controller $\Phi_V$ may control or adjust the phase of the vertical polarization signal $S_V$.

The circularly polarized radio wave W2 may be a left-hand circularly polarized radio wave or a right-hand circularly polarized radio wave. The antenna T may be a patch antenna. The conductive element B may be a conductive bump, a solder bump, a solder ball or a tin ball. The semiconductor device may be a semiconductor package, a semiconductor structure or a chip package. The antenna device may be an AiP, such as an mm wave AiP. The mobile communication device may be a 5G mobile communication device. However, the present disclosure is not limited to the above-mentioned.

The testing system 2 may further comprise a second phase retarder 22. The second phase retarder 22 is electrically connected to second power splitter 32 and delays a phase of the second high frequency signal N2 from the second power splitter 32 by 90 degrees (i.e., ±90 degrees or a time difference being ¼ wavelength) to form a second high frequency signal NT with a phase delay of 90 degrees.

The testing system 2 may further comprise a fourth power splitter 34. The fourth power splitter 34 is electrically connected to second phase retarder 22 and the first power splitter 31 and receives and synthesizes the second high frequency signal NT with the phase delay of 90 degrees from the second phase retarder 22 and the first high frequency signal N1 from the first power splitter 31 into a high frequency signal Nb, for example.

The testing system 2 may further comprise a second power meter 42. The second power meter 42 is electrically connected to the fourth power splitter 34 and measures power of the second high frequency signal N2' with the phase delay of 90 degrees and the first high frequency signal N1 received or synthesized by the fourth power splitter 34, and determines defects of the conductive element B on the horizontal polarization path H or the vertical polarization path V of the object-to-be-tested A based on the power.

In FIG. 3, when a radio wave of the antenna T of the object-to-be-tested A and the circularly polarized radio wave of the bilinear polarized antenna 10 are matched, the first power meter 41 or the second power meter 42 reads a maximum of the power or its gain, which indicates that the conductive element B of the object-to-be-tested A is not defective. When the radio wave of the antenna T of the object-to-be-tested A and the circularly polarized radio wave of the bilinear polarized antenna 10 are not matched, the first power meter 41 or the second power meter 42 reads a value of the power or its gain that varies sensitively (changes significantly), which indicates that the conductive element B of the object-to-be-tested A may be defective.

In FIG. 3, the testing system 2 has to cooperate with the phase control of the object-to-be-tested A. Each of the antenna T is connected to the circuits of the horizontal polarization path H and the vertical polarization path V respectively, and the phase controller $\Phi_H$ and the phase controller $\Phi_V$ are disposed on the circuits for setting phases of the horizontal polarization signal $S_H$ and the vertical polarization signal $S_V$. In an embodiment, each of the antenna T is connected to the phase controller $\Phi_H$ and the phase controller $\Phi_V$ respectively, the phase of the object-to-be-tested A is set to be an equation $\Phi_H=\Phi_V+90$ or an equation $\Phi_H=\Phi_V-90$, and this setting has to match a left-hand circularly polarized radio wave or a right-hand circularly polarized radio wave of the testing system 2.

Figure 4:
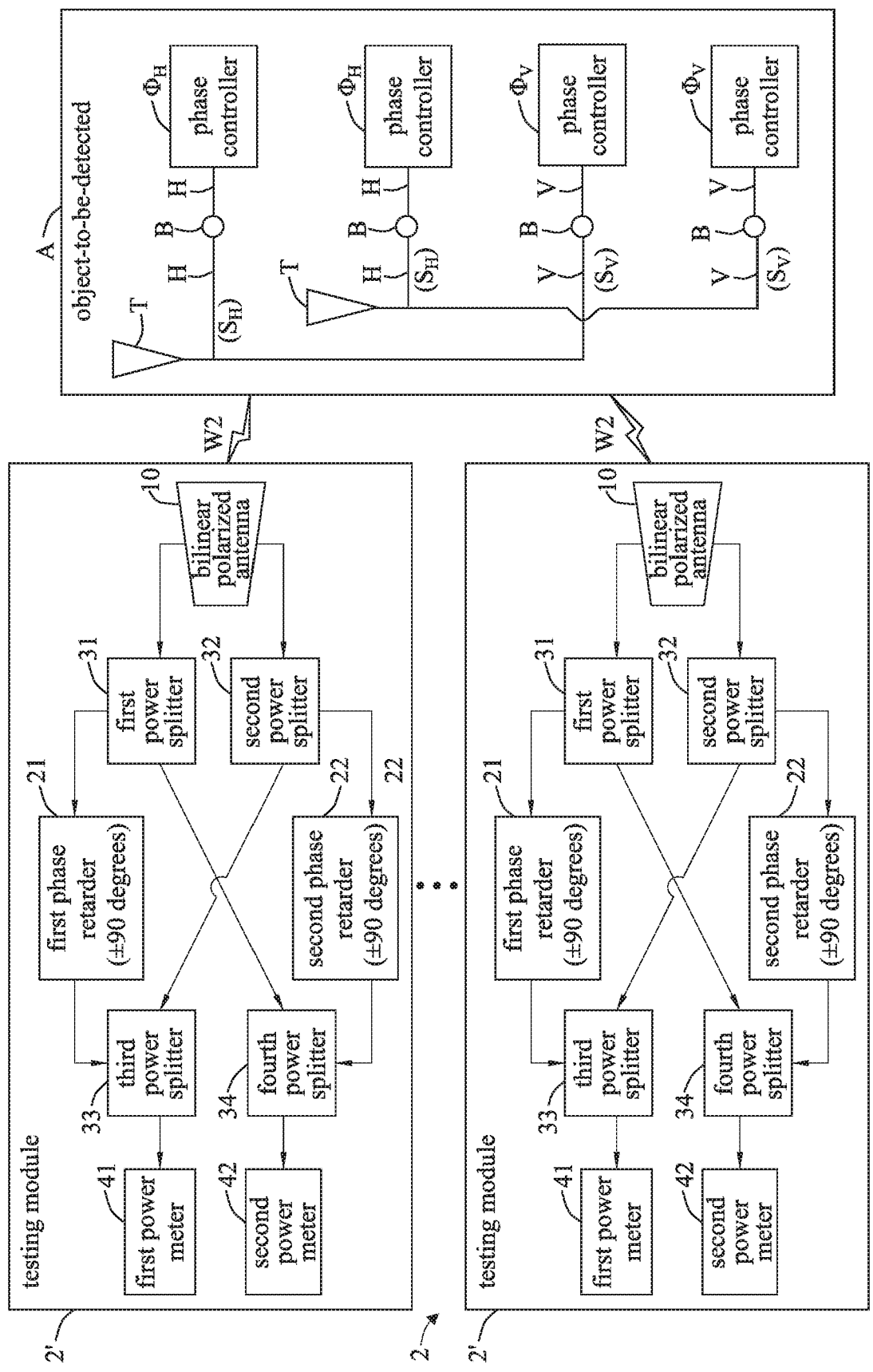
FIG. 4 is a schematic diagram of an embodiment of the testing system of FIG. 3 according to the present disclosure.

FIG. 4 is a schematic diagram of an embodiment of the testing system 2 of FIG. 3 according to the present disclosure. As shown in FIG. 4, the testing system 2 may comprise a plurality of the testing modules 2', each of which includes the bilinear polarized antenna 10, the first phase retarder 21, the second phase retarder 22, the first power splitter 31, the second power splitter 32, the third power splitter 33, the fourth power splitter 34, the first power meter 41 and the second power meter 42, which are described in accordance with FIG. 3.

Figure 5:
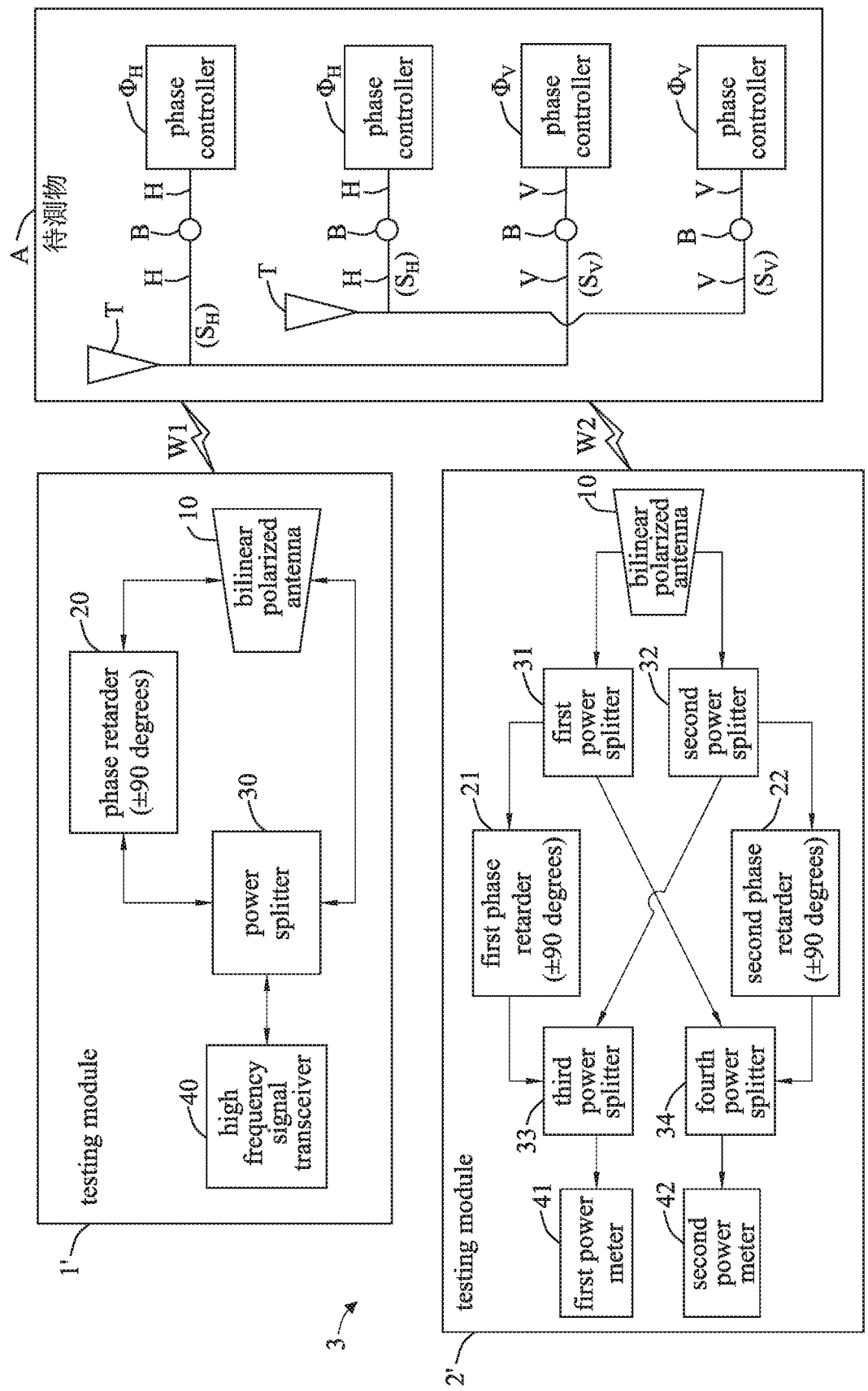
FIG. 5 is a schematic diagram illustrating integration of the testing module of FIGS. 1A and 1B and the testing module of FIG. 3 into a testing system according to the present disclosure.

FIG. 5 is a schematic diagram illustrating integrating the testing module 1' of FIGS. 1A and 1B and the testing module 2' of FIG. 3 into a testing system 3 according to the present disclosure. The testing system 3 may be constituted by the testing module 1' (the testing system 1) of FIGS. 1A and 1B and the testing module 2' (the testing system 2) of FIG. 3. The testing modules 1' and 2' are described in accordance with FIGS. 1A, 1B and 3.

When the testing system 1 of FIGS. 1A and 1B or FIG. 2 is used, in the ideal case when all the conductive elements B on the object-to-be-tested A are perfect, the radio wave of the antenna T of the object-to-be-tested A and the circularly polarized radio wave of the testing system 1 should be matched, and the high frequency signal transceiver 40 will read a maximum of the power or the gain. When some conductive elements B are defective, the channel energy of the horizontal polarization path H or the vertical polarization path V is attenuated, the radio wave and the circularly polarized radio wave are not matched, the high frequency signal cannot enter the high frequency signal transceiver 40, and the readings of the power or the gain of the high frequency signal transceiver 40 vary sensitively (change significantly). Therefore, the present disclosure can measure the horizontal polarization path H and the vertical polarization path V of the object-to-be-tested A at the same time, thus reducing the testing time.

When the testing system 2 of FIG. 3 or FIG. 4 is used, in addition to the results of the testing system 1, the testing system 2 can also read the value of the power or the gain of another circularly polarized radio wave that does not match the radio wave. The value can provide another characteristic (an ideal value being close to zero) for determining the quality of the conductive element B of the object-to-be-tested A. Therefore, the testing system 2 can provide more accurate determination, which is advantageous in analyzing the defect of the conductive element B.

In sum, the present disclosure has at least the features, advantages or technical efficacy as follows.

The testing system according to the present disclosure can test a horizontal polarization path and a vertical polarization path of an object-to-be-tested at the same time. Therefore, the time for switching the horizontal polarization path or the vertical polarization path is saved, the measurement of the object-to-be-tested is speeded up (e.g., two times faster), and about a half of the testing time is saved.

The testing system according to the present disclosure can test states of a horizontal polarization path and a vertical polarization path of an object-to-be-tested and quality of a conductive element thereon fast, and get to know whether the horizontal polarization path and the vertical polarization path are not good or abnormal or the conductive element is defective and has poor bonding quality.

The testing system according to the present disclosure can be used for OTA measurement for an object-to-be-tested such as an mm wave AiP.

The testing system according to the present disclosure can reduce the requirements of an isolating box (a metal isolation room) for absorbing waves and specification requirements, to reduce the installation cost of the isolating box.

The foregoing descriptions of the detailed embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. A testing system, comprising:
a bilinear polarized antenna configured for receiving and dividing a circularly polarized radio wave associating with a horizontal polarization path and a vertical polarization path of an object-to-be-tested into a first high frequency signal and a second high frequency signal;
a phase retarder electrically connected to the bilinear polarized antenna and configured for delaying a phase of the first high frequency signal from the bilinear polarized antenna by 90 degrees to form a first high frequency signal with a phase delay of 90 degrees;
a power splitter electrically connected to the phase retarder and the bilinear polarized antenna and configured for receiving or synthesizing the first high frequency signal with the phase delay of 90 degrees from the phase retarder and the second high frequency signal from the bilinear polarized antenna; and
a high frequency signal transceiver electrically connected to the power splitter and configured for measuring power of the first high frequency signal with the phase delay of 90 degrees and the second high frequency signal received or synthesized by the power splitter and determining states of the horizontal polarization path and the vertical polarization path of the object-to-be-tested based on the power.

2. The testing system of claim 1, wherein the circularly polarized radio wave is a left-hand circularly polarized radio wave or a right-hand circularly polarized radio wave.

3. The testing system of claim 1, wherein the object-to-be-tested is a semiconductor device, an antenna device or a mobile communication device having the horizontal polarization path, the vertical polarization path and an antenna, wherein the antenna forms the circularly polarized radio wave based on a horizontal polarization signal from the horizontal polarization path and a vertical polarization signal from the vertical polarization path and transmits the circularly polarized radio wave to the bilinear polarized antenna.

4. The testing system of claim 1, wherein when the testing system is in a transmitting mode, the high frequency signal transceiver transmits a high frequency signal, the power splitter divides the high frequency signal into a third high frequency signal and a fourth high frequency signal, and the phase retarder delays a phase of the third high frequency signal from the power splitter by 90 degrees to form a third high frequency signal with a phase delay of 90 degrees.

5. The testing system of claim 4, wherein the bilinear polarized antenna further forms another circularly polarized radio wave based on the third high frequency signal with the phase delay of 90 degrees from the phase retarder and the fourth high frequency signal from the power splitter, and transmits the another circularly polarized radio wave to an antenna of the object-to-be-tested, and wherein the antenna divides the another circularly polarized radio wave into a horizontal polarization signal and a vertical polarization signal passing through the horizontal polarization path and the vertical polarization path, respectively.

6. The testing system of claim 1, wherein when a radio wave of an antenna of the object-to-be-tested and the circularly polarized radio wave of the bilinear polarized antenna are matched, the high frequency signal transceiver reads a maximum of the power or its gain, and when the radio wave of the antenna of the object-to-be-tested and the circularly polarized radio wave of the bilinear polarized antenna are mismatched, the high frequency signal transceiver reads a value of the power or its gain that varies sensitively.

7. The testing system of claim 1, wherein the bilinear polarized antenna, the phase retarder, the power splitter and the high frequency signal transceiver constitute a testing module, and the testing system comprises a plurality of the testing modules.

* * * * *